(12) United States Patent
Schmitt et al.

(10) Patent No.: US 8,064,072 B2
(45) Date of Patent: Nov. 22, 2011

(54) METHOD AND APPARATUS FOR THICKNESS MEASUREMENT

(75) Inventors: Peter Schmitt, Erlangen (DE); Guenther Kostka, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 270 days.

(21) Appl. No.: 12/517,396

(22) PCT Filed: Dec. 6, 2007

(86) PCT No.: PCT/EP2007/010613
§ 371 (c)(1),
(2), (4) Date: Jun. 5, 2009

(87) PCT Pub. No.: WO2008/071338
PCT Pub. Date: Jun. 19, 2008

(65) Prior Publication Data
US 2010/0073689 A1    Mar. 25, 2010

(30) Foreign Application Priority Data

Dec. 15, 2006  (DE) .......................... 10 2006 059 415

(51) Int. Cl.
*G01B 11/28* (2006.01)
(52) U.S. Cl. ........................................ 356/630; 356/625
(58) Field of Classification Search .......... 356/630–632, 356/625, 635, 637, 601, 602, 614, 615, 622, 356/623, 429, 431, 4.01, 4.06, 3.01; 250/201.6, 250/559.22, 559.19, 559.23, 559.24, 559.26, 250/559.27, 206.2, 559.31, 559.29; 324/229–230, 324/202, 225, 601, 662, 671
See application file for complete search history.

(56) References Cited

U.S. PATENT DOCUMENTS

| | | | |
|---|---|---|---|
| 3,187,185 A | 6/1965 | Milnes | |
| 4,564,296 A | 1/1986 | Oshida et al. | |
| 4,773,760 A | 9/1988 | Makkonen | |
| 4,803,371 A | 2/1989 | Durland | |
| 5,485,082 A | 1/1996 | Wisspeintner et al. | |
| 5,905,576 A | 5/1999 | Takada et al. | |
| 6,281,679 B1 | 8/2001 | King et al. | |
| 6,967,726 B2 | 11/2005 | King et al. | |

FOREIGN PATENT DOCUMENTS

| | | |
|---|---|---|
| CA | 2 070 822 A1 | 6/1991 |
| DE | 36 42 377 A1 | 11/1987 |
| DE | 40 11 717 C2 | 10/1991 |

(Continued)

OTHER PUBLICATIONS

Official Communication issued in International Patent Application No. PCT/EP2007/010613, mailed on Mar. 6, 2008.
Cielo, "Optical Sensors for On-Line Inspection of Industrial Materials," Optical Engineering, vol. 32, No. 9, Sep. 1993, pp. 2130-2137.

(Continued)

*Primary Examiner* — Tri T Ton
(74) *Attorney, Agent, or Firm* — Keating & Bennett, LLP

(57) ABSTRACT

The material strength of extensive objects can be determined efficiently by using two distance measures, wherein a first distance measurer determines the distance to a first main surface of the object and a second distance measurer determines the distance to a second main surface object opposing the first main surface. If potential measurement errors due to the extensive geometry are avoided by determining a reference distance between the first distance measurer and the second distance measurer by a reference object, the thickness of the object between the first main surface and the second main surface can be determined with high accuracy and velocity.

14 Claims, 5 Drawing Sheets

FOREIGN PATENT DOCUMENTS

| | | |
|---|---|---|
| DE | 42 20 501 A1 | 1/1994 |
| DE | 197 57 716 A1 | 7/1998 |
| DE | 197 33 297 A1 | 2/1999 |
| DE | 100 60 144 A1 | 6/2002 |
| FR | 1 312 164 A | 12/1962 |
| GB | 2 046 900 A | 11/1980 |
| JP | 60-164202 A | 8/1985 |
| JP | 2004-037253 A | 2/2004 |
| WO | 91/08439 A1 | 6/1991 |

OTHER PUBLICATIONS

Schmitt et al.; "Method and Apparatus for Thickness Measurement"; U.S. Appl. No. 12/516,012, filed May 22, 2009.

Official Communication issued in corresponding International Patent Application No. PCT/EP2007/010613, mailed on Jul. 30, 2009.

METHOD AND APPARATUS FOR THICKNESS MEASUREMENT

The present invention relates to the thickness measurement of extensive geometrical objects and, in particular, to how the thickness of materials produced in webs, such as sheet metals, files or paper can be determined efficiently.

BACKGROUND OF THE INVENTION

In thickness measurement of geometrically extensive objects, a number of problems arises, in particular when, such as in industrially-preprocessed sheets, the thickness of the objects to be tested can vary in a wide range, such as from 0.01 mm to several centimeters. If the geometrical extension in relation to the thickness of the objects is large or, in one direction, even approximately infinite, such as in materials, such as foils, paper or sheet metals wound on rollers, the problem exists that the thickness of a large area of the object has to be determined with a single measurement for keeping the overall measurement period at an acceptable level. Additionally, the problem arises that, in particular with materials produced in the form of webs, the demand for the tolerance of the thickness of the web is typically particularly high. For example, in automotive engineering, the sheet metal strengths are partly specified with extremely low tolerances, since maintaining the sheet metal strength is significant for the crash behavior of the finished vehicles. Additionally, when controlling sheet metal thicknesses, it also has to be considered that sheet metals are typically produced with high velocity in rolling mills, so that a large sheet metal area has to be tested per time unit. Among others, industrial rolling machines are used that can generate sheet metals with a width of up to 3 meters. Additionally, the sheet metal consists of a material that is opaque for conventional optical radiation, which additionally impedes measurement of sheet metal strength. Tactile methods that can determine the thickness of the sheet metal in a spatially resolved manner by directly contacting the surface of the same, can hardly be used for such a purpose, since the same would have to mechanically detect a plurality of measurement points, which would increase the effort and thus, the cost for the quality control significantly. In industrial production methods, sheet metals are frequently generated so fast that the same exit at the output of a rolling apparatus with such high speeds that these sheet metals vibrate in a direction perpendicular to the surface. In such cases, the usage of tactile methods is, in principle, not possible. Similar considerations apply, apart from sheet metals, to a plurality of other planar materials, such as foils, paper, glasses or similar elements, which necessitate specific material strength control with high accuracy.

Due to the problems outlined above, monitoring the wall strength during production is extremely expensive, with sheet metals it is generally performed radiometrically, i.e. by using radio-active sources or X-ray tubes for generating X-radiation and detectors sensitive to radio-active rays or X-rays, respectively. Thereby, the material to be tested is screened with X-radiation or gamma radiation and the wall strength of the screened material is determined by the ray attenuation caused by absorption of the radiation in the material to be tested. Therefore, the ray intensity or the original ray intensity, respectively, has to be known and the ray intensity remaining after screening the material has to be detected by appropriate detectors. Radiation-sensitive detectors are generally very expensive apparatuses. Currently, for example, normally counting tubes are used, which means detector tubes filled with gas and provided with high voltage, since the same are relatively long-term stable and show little drift (for example, temperature-induced). When monitoring the production of broad sheet metals, sometimes up to 100 of such detectors, and possibly several X-ray sources, have to be used for obtaining the necessitated spatial resolution or sensitivity, respectively, of the thickness measurement across the whole width of the sheet metals that are up to 3 meters wide. Here, realistically obtainable measurement accuracies are in the range of 0.1% of the wall thickness, which means approximately 10 µm in sheet metals of 10 mm. An obvious disadvantage is the high costs induced by such a measuring apparatus. For example, a high-voltage channel of a high-voltage supply and a read-out or evaluation channel, respectively, of a signal processing electronic has to be provided for every counting tube.

A further disadvantage is that the obtainable measurement accuracy is determined by the statistics of X-radiation (Poisson statistics). Thus, the signal to noise ratio is determined by the square root of the detected X-ray quanta. With the given available measurement time, the spatial resolution or the thickness sensitivity, respectively, is limited. Although basically the measurement accuracy can be increased by a longer measurement period or integration time, respectively, this is not arbitrarily possible in industrial scale, since the material coming out of a production line has to be tested within a limited period of time. The basically possible activity increase of the used X-ray sources also increases the risk in a radiation accident and can, thus, only contribute in a limited manner to increasing the measurement speed or the obtainable measurement accuracy, respectively.

Additionally, for the usage in connection with extensive materials, such as sheet metal rolls, the X-ray method is only partly suitable, since the typical commercial detectors (counting tubes) have an extension of merely several centimeters, so that, as has already been mentioned above, a plurality of such detectors has to be used. Additionally, the obtainable spatial resolution is heavily limited by the finite extension of the counting tubes, since an individual counting tube can only detect the existence of a gamma quantum in the area covered by the same, wherein a further differentiation of the location of the gamma quantum within the counting tube is not possible.

The conventional X-ray methods have the disadvantage that they can obtain only a limited spatial resolution and that they use detectors, whose acquisition and operation is extremely complex and cost-intensive.

The international application WO 91/08439 relates to generating sectional views or sectional representations, respectively, of extensive three-dimensional objects via light-slit measuring methods. A light measuring strip is projected onto the surface of the object via at least two light sources. The projected light measuring strip is imaged via several cameras, wherein the images are supplied to an evaluation means. When the geometry of the arrangement is known, the evaluation means can reconstruct the outline of the projected light measuring strip.

U.S. Pat. No. 4,564,296 describes a method for determining the thickness of a plate, wherein an optical test pattern is projected onto the surface of the plate to be measured. For determining the distance between two optics arranged on different sides of the object to be measured, a test pattern is projected onto the surface of the object. The distance is determined by shifting or varying the optic until the projected test pattern on the surface of the object reaches maximum sharpness. Further, an area with a reference thickness exists on the object carrier mechanically holding the object to be measured.

SUMMARY

According to an embodiment, a measuring apparatus for determining the material strength of an object may have: a reference object of a predetermined thickness between a first reference main surface and a second reference main surface, wherein the first reference main surface is facing a first distance measuring means and the second reference main surface is facing a second distance measuring means; wherein the first distance measuring means is implemented as light-slit measuring means for simultaneously determining a first distance between the first distance measuring means and a first main surface of the object facing the first distance measuring means as well as a distance between the first reference main surface and the first distance measuring means in measurement direction; and wherein the second distance measuring means is implemented as light-slit measuring means for simultaneously determining a second distance between the second distance measuring means and a second main surface of the object opposing the first main surface as well as a distance between the second distance measuring means and the second reference main surface in measurement direction; and an evaluation means for determining the material strength of the object between the first main surface and the second main surface by using the first distance, the second distance, the predetermined thickness, the distance between the first reference main surface and the first distance measuring means, and the distance between the second reference main surface and the second distance measuring means.

According to another embodiment, a method for determining the material strength of an object may have the steps of: determining a first distance between a first distance measuring means implemented as light-slit measuring means and a first main surface of the object facing the first distance measuring means in a measurement direction substantially perpendicular to the first main surface of the object and simultaneously determining a distance between a first reference main surface of a reference object of a predetermined thickness and the first distance measuring means in the measurement direction; determining a second distance between a second distance measuring means implemented as light-slit measuring means and a second main surface of the object opposing the first main surface in measurement direction and simultaneously determining a distance between a second reference main surface of the reference object opposing the first main surface and the second distance measuring means in the measurement direction; and determining the material strength of the object between the first main surface and the second main surface by using the first and second distances as well as the predetermined thickness, the distance between the first reference main surface and the first distance measuring means and the distance between the second reference main surface and the second distance measuring means.

The present invention is based on the knowledge that the material strength of extensive objects can be determined efficiently by using two light-slit measuring means, wherein a first light-slit measuring means determines the distance to a first main surface of the object and a second light-slit measuring means determines the distance to a second main surface of the object opposing the first main surface. If potential measurement errors due to the extensive geometry are avoided by the fact that a reference object determines a reference distance between the first distance measuring means and the second distance measuring means, the thickness of the object between the first main surface and the second main surface can be determined with high accuracy and velocity. Thereby, light-slit measuring means are used that can determine the distance to an extensive area on the surface of the object by a single measurement.

In other words, it is the basic idea of the invention to determine the thickness of a web material by determining the distance from the upper and lower side of the web material to a detector arranged above or below, respectively, the web material, which allows, for example, a linear measurement of the distance. Suitable for this is, for example, the light-slit method. The problem of surface measurement of extensive objects is generally that due to the extension (for example, the large width of web materials), a mechanical structure for suspending the detectors above and below the object (web material) is necessitated. Due to the large geometrical extension, it cannot be ensured that vibrations or thermal deformations do not corrupt the measurement result, in particular, since high-precision measurements in the range of several micrometers are to be performed. Such vibrations or deformations can, thus, cause a measurement error outside the normally necessitated tolerances. According to this invention, this problem is solved by using a reference means for determining a reference distance between the first distance measuring means and the second distance measuring means. Thereby, a possible change of the distance of the two detector means above or below, respectively, the web material as well as, additionally, optionally possible tilting of one or several measurement heads perpendicular to the measurement direction is avoided. If, for example, web material is measured, such tilting along the advance direction of the produced web material could cause an additional measurement error, which can be corrected according to the invention.

Thus, in one embodiment of the present invention, a first light-slit measuring means is used for determining a first distance between the first light-slit measuring means and the first main surface of a web material to be measured. A second light-slit measuring means is used for determining a second distance from the second light-slit measuring means to a second main surface of the web material opposing the first main surface of the web material. The distance from the first light-slit measuring means to the second light-slit measuring means in the measurement direction is determined additionally as a reference distance by a reference means. Here, the measurement direction is the direction running parallel to the thickness of the object, which means perpendicular to the main surfaces.

According to an embodiment of the present invention, the measuring means is used for checking the thicknesses of sheet metals produced by a press immediately after their production. Therefore, the sheet metals are moved in an advance direction between the first light-slit measuring means and the second light-slit measuring means.

Here, the great advantage of using contactless light-slit measuring means is that, the distance of the web material or the sheet metal web to the measurement head can be linearly detected across a width of more than 1 m by a single measurement. This means, with only a single measurement, a height profile perpendicular to the advance direction can be obtained, which describes more than 1 m of material width. Here, additionally, the spatial resolution is heavily increased compared to radiation detectors in that the geometrical extension of the projected light strip limiting the resolution in the advance direction can, in principle, be made as small as desired in the advance direction. By varying the advance speed of the sheet metal material coming out of the press, the spatial resolution of the topography information, which means the height information on the surface of the material to be tested or the thickness profile, respectively, can be varied in any way.

In a method alternative to the present invention, a radiation detector is used as reference means for determining the reference distance between the first and the second light-slit measuring means or between the first and the second distance measuring means, respectively. Thereby, the radiation detector determines, for a position on the surface of the object to be tested, the material strength of the same by measuring the radiation intensity lost by absorption. The first and the second light-slit measuring means perform a distance measurement of the surface area to the light-slit measuring means in the same surface area. Based on the radio-metrically determined thickness of the object to be tested in a small geometrical area and the measurement of the distances of the light-slit measuring means to exactly this area, the exact distance of the first and second light-slit measuring means can be determined with high accuracy as reference distance. Any thermally or mechanically induced distance variations can, thus, be compensated with high precision.

According to this alternative, complex and cost-intensive radiometric distance measurement methods only have to be used for a limited area on the surface of the object to be tested or once per distance measuring means, respectively. Thereby, the costs can be reduced. Apart from this, for the above-mentioned reasons, the obtainable spatial resolution of the thickness profile to be measured is significantly increased by the light-slit method.

In a further alternative, the obtainable measurement accuracy in the thickness direction can be additionally increased by performing a second radio-metric measurement with an X-ray means, wherein the X-ray means is connected to the first light-slit measuring means and the second light-slit measuring means. If the measurement with the second X-ray means is performed along a different X-ray direction than with the first X-ray means, for example at another angle relative to the surface of the object to be tested, possible tilting or possible geometric misalignment, respectively, of the light slit-measuring means can be assumed. Thereby, the measurement accuracy can be further increased by performing, in addition to the distance of the two light-slit measuring means, also a correction of erroneous relative orientation in a further dimension of the two light-slit measuring means to each other.

In one embodiment of the present invention, a reference object of predetermined known thickness is mounted on one or both sides of the web material to be measured or the object to be measured, respectively, so that the same is additionally measured by both light-slit measuring means together with the surface of the object to be measured. The light-slit measuring means have to be arranged such that part of the measuring light strip generated on the surface of the object by the light-slit measuring means is mapped onto the surfaces of the reference objects facing the light-slit measuring means.

Determining the reference distance can then be performed by determining the distance of the first and second light-slit measuring means to the surfaces of the reference object facing the same simultaneously with the distance to the object to be measured. Since the thickness of the reference object is exactly known, the distance between the first light-slit measuring means and the second light-slit measuring means can be calculated easily as reference distance. Thus, according to the invention, frequently, a material that is subject to a low thermal expansion is used for the reference objects.

As long as it is geometrically possible to detect respective reference objects simultaneously with the objects to be tested by the light-slit measuring means by simple insertion of cost-effective reference objects, maintaining the measurement accuracy can be ensured. Thus, the usage of expensive X-ray detectors can be fully omitted.

In a further embodiment of the present invention, mounting reference objects on both sides of a web material to be tested additionally increases the obtainable measurement accuracy.

In summary, it can be said that the inventive method or the inventive apparatus, respectively, has the potential to obtain a higher spatial resolution and to increase the measurement velocity overall, wherein, at the same time, the cost of the used detectors can be significantly decreased compared to the prior art. This is obtained by supplementing radiometric detectors partly or completely by other measurement systems that can detect distances on a line or in an extensive geometrical area, such as light-slit methods.

Other features, elements, steps, characteristics and advantages of the present invention will become more apparent from the following detailed description of preferred embodiments of the present invention with reference to the attached drawings.

BRIEF DESCRIPTION OF THE DRAWINGS

Embodiments of the present invention will be detailed subsequently referring to the appended drawings, in which.

DETAILED DESCRIPTION OF THE INVENTION

Since the inventive concept will be discussed in the following sections by using light-slit measuring means, the light-slit measurement method will be described briefly based on a simple example with regard to FIG. 5.

Figure 5:
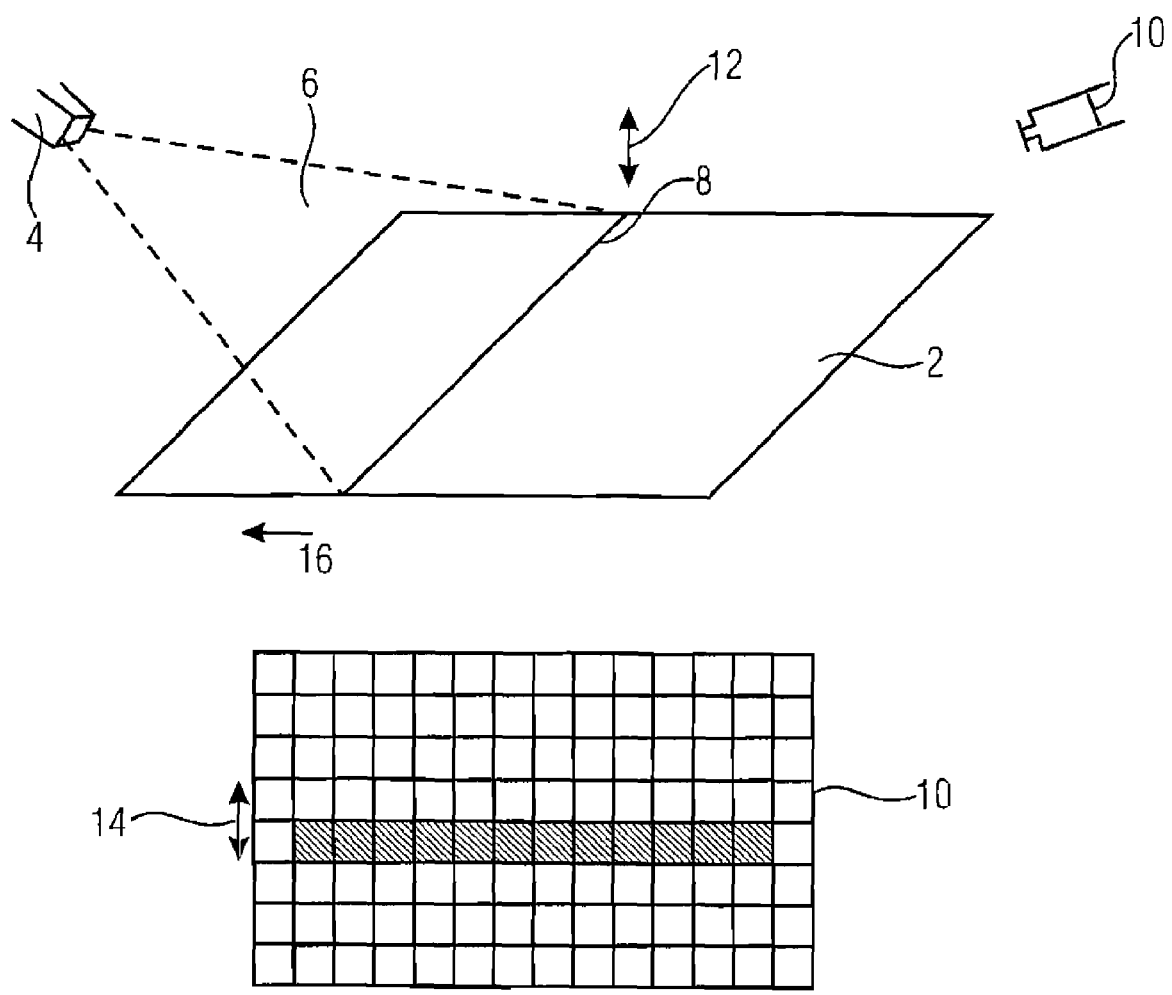
FIG. 5 is a comparative example of a light-slit measurement method.

FIG. 5 shows the surface of an object to be measured 2, a measuring light projector 4 emitting light in a light plane 6, so that a measuring light strip 8 is generated on the surface of the object 2. In the simplified case of a perfectly plane surface 2 shown in FIG. 5, the measuring light strip 8 is the straight line shown in FIG. 5.

The measuring light strip 8 is recorded via an appropriate sensor 10. In the example shown in FIG. 5, the sensor 10 is a two-dimensional matrix sensor, such as a CCD or a CMOS sensor. The exact type of sensor is not significant for the mode of operation of the inventive concept, generally, other types of sensors can be used as well.

If a measuring light line 8 is generated on the surface 2 of the object as a straight line, the image of the straight line, as shown in FIG. 5, will be mapped on the sensor 10. The height information results from the geometry of the overall structure, in particular from the relative position of the sensor 10 and the measuring light projector 5. If, for example, the surface 2 of the object is moved in a direction 12, the measuring light strip is generated at another position on the surface 2 of the object, since the light plane 6 remains unaltered in space. Since the sensor 10 is also stationary, the image of the measuring light line (symbolized by black squares) will vary on the sensor in a direction 14. When the geometry of the light plane 6 and the sensor 10 is known, as is described above, the position of the surface 2 of the object in direction 12 can be inferred.

Equivalent considerations apply when the surface of the object is not plane. With the light-slit method shown in FIG. 5, topography information or height information, respectively, across the whole width of the surface 2 can be determined via a single pick-up of the sensor 10.

Sensors 10 specialized for light-slit measurement methods that can perform signal processing themselves at high speeds are used, so that the same merely provide, for example, the information about the brightest illuminated pixel of the sensor 10 as a measurement result. Such highly specialized sensors are thus particularly suited for fast measurement, since extensive signal post-processing, as it is necessitated, for example, with conventional CCD, can be omitted.

In summary, light-slit measurement methods have the significant advantage that the height information along a spatially extensive measurement line 8 can be obtained with high velocity.

If the surface 2 is moved in a direction perpendicular to the measuring light line 8, and in a direction 16 below the light plane, and if pick-ups are performed successively by the sensor 10, the whole topography of the surface 2 of the device under test can be determined within a short time, which predestines the light-slit measurement method for the usage in measuring spatially extensive surfaces.

In the embodiments of the present invention described below, light-slit measurement methods are used for illustrating the inventive concept. However, with regard to its application, the inventive concept is in no way limited to the used light-slit measurement method. Rather, any other measurement methods that can measure the topography of a surface by distance measurement can be used according to the invention.

Figure 1:
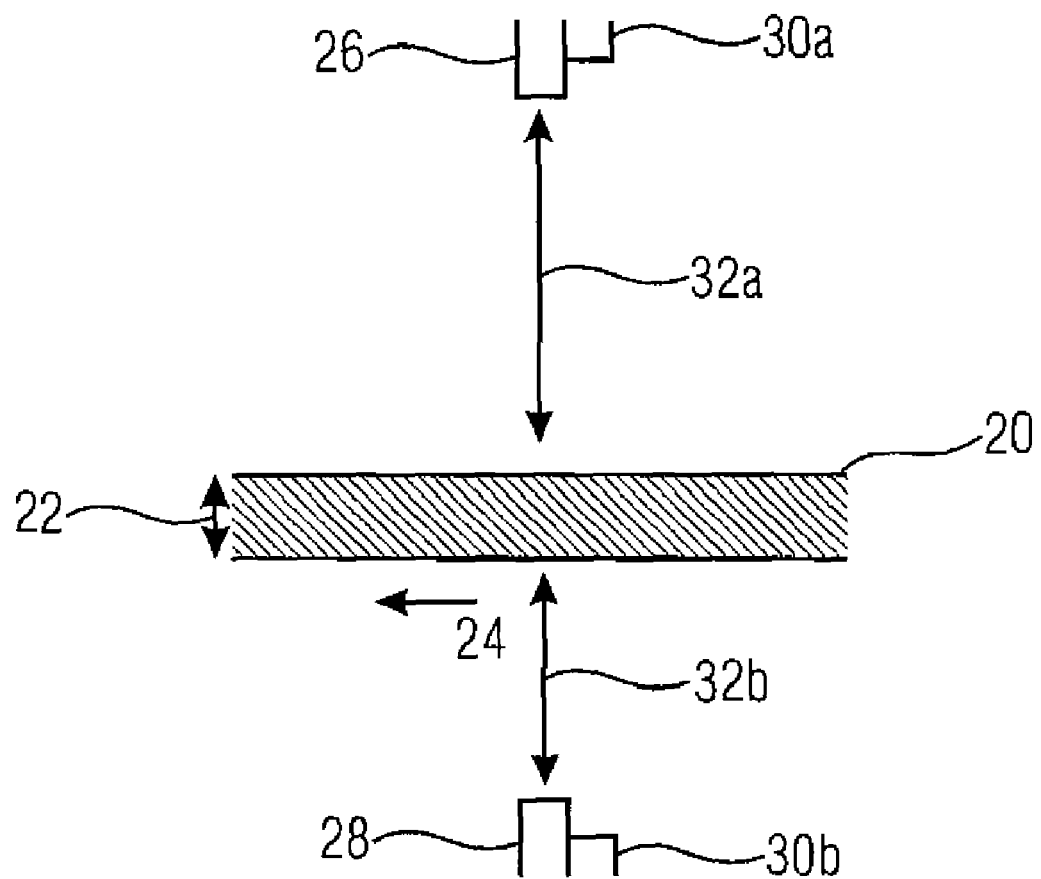
FIG. 1 is an alternative to the present invention with radiometric determination of the reference distance.

FIG. 1 shows an alternative to the present invention, wherein the reference distance is determined by radiometric measurement. FIG. 1 schematically shows, in a cut-away view, an object 20 to be measured, whose material strength 22(d) is to be determined, wherein the object 20 can be moved in a direction 24 between a first distance measuring means 26 and a second distance measuring means 28. FIG. 1 additionally shows a reference means, comprising an X-ray source 30a and an X-ray detector 30b, wherein the X-ray source 30a is arranged with regard to the first distance measuring means 26 and the X-ray detector 30b with regard to the second distance measuring means in a known geometrical position. This can also mean, for example, that the same are also connected in a mechanical manner. For the mode of operation of the inventive concept, it does not matter to which of the two distance measuring means the X-ray source 30a is connected, according to the invention, a mirror-image configuration is also possible.

The first and second distance measuring means 26 or 28, respectively, are shown merely schematically in FIG. 1, just as the X-ray source 30a and the X-ray detector 30b. The exact operating principle of the distance measuring means 26 or 28, respectively, is not significant for the application of the inventive concept. It is advantageous when the distance measuring means 26 and 28 can determine with one measurement, one distance to an extensive geometrical area on the surface of the object to be measured 20 associated with the same. This is, for example, the case in an inexpensive manner in the light-slit measuring means described with regard to FIG. 5. According to the invention, a first distance 32a between a first main surface of the object 20 associated with the first distance measuring means 26 and the first distance measuring means 26 is determined. A second distance 32b between the second distance measuring means 28 and a second main surface of the object 20 facing the second distance measuring means 28 is determined by the second distance measuring means 28.

The distance between the first and the second distance measuring means 26 and 28 can be determined as a reference distance by the X-ray source 30a and the X-ray detector 30b. Alternatively, the thickness of the object in a selected geometrical area of the object can be determined as reference distance. Therefore, the X-ray detector 30b determines the X-ray intensity emitted by the X-ray source 30a attenuated by the material strength of the object to be measured 20. By knowing the absorption behavior of the material of the object 20, the thickness 22 of the object 20 can be inferred. According to the invention, X-ray source 30a and X-ray detector 30b are connected to one distance measuring means each, and the thickness 22 of the object 20 is determined by the X-ray measuring means at a position of the surface of the object 20, which is also detected by the distance measurement of the distance measuring means 26 and 28. The distance between the first and second distance measuring means can be calculated from the sum of the distances 32a, 32b and the thickness 22 as reference distance.

In this alternative, the expensive X-ray technology is only used in a geometrically very limited part of the surface of the object 20 for determining the distance of the two distance measuring means from each other or to temporally track the same, respectively. The inventive high measurement accuracy of the material strength of the object can thus also be maintained with thermally or mechanically induced variations of the distance of the two distance measuring means 26 and 28.

Figure 2:
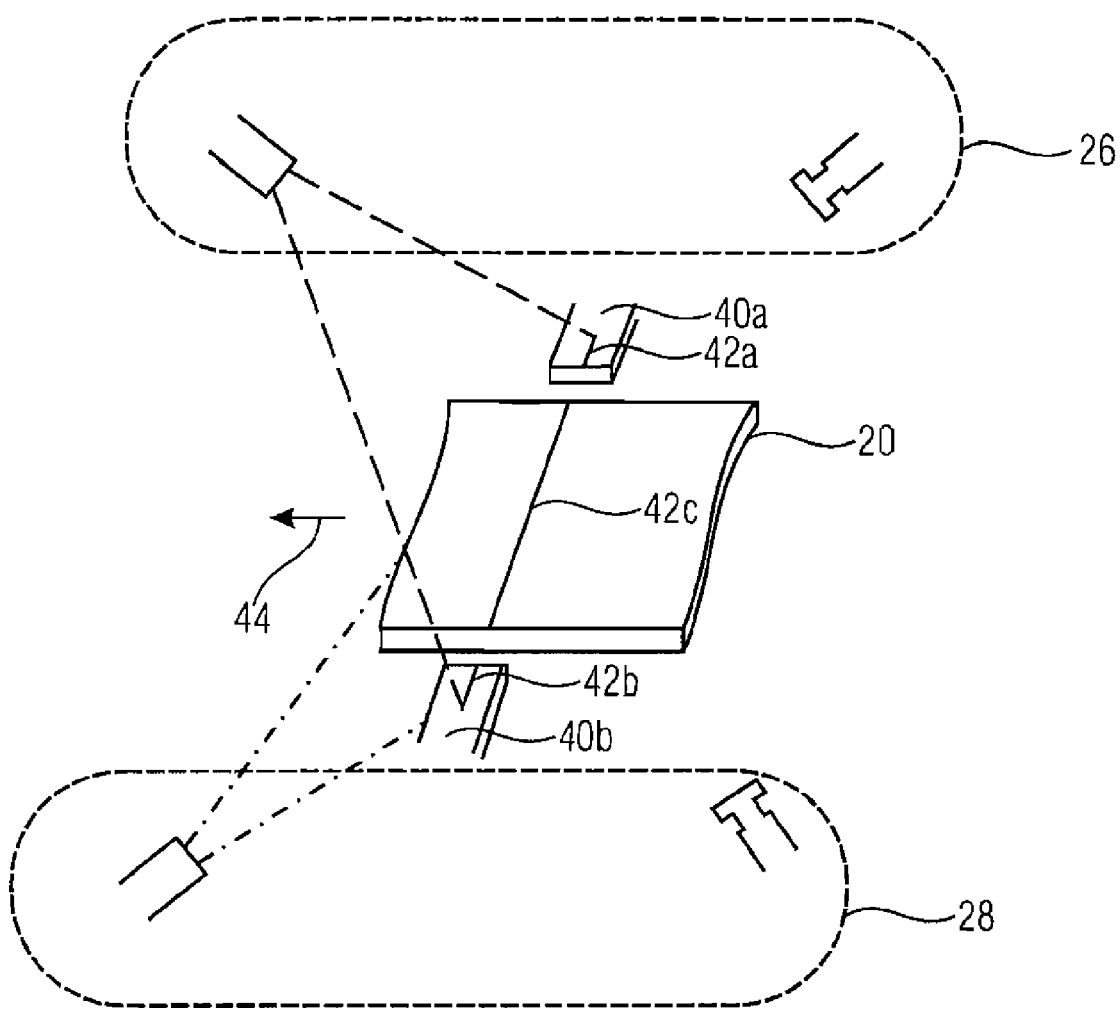
FIG. 2 is an embodiment of the present invention with reference objects for determining the reference distance.

FIG. 2 shows a further embodiment of the present invention, where the reference distance is determined by optical measurement.

In FIG. 2 and the four following Figures, functionally similar or functionally identical components, respectively, are provided with the same reference numerals, so that the description of the individual components can be mutually applied to different Figures. Additionally, objects provided with identical reference numerals can be alternatively used within the individual embodiments described below.

FIG. 2 shows, as a first distance measuring means 26, a light-slit measuring means, as it has already been described with regard to FIG. 5. As a second distance measuring means 28, a light-slit measuring means is used as well. Additionally, FIG. 2 shows the object to be measured 20 in a perspective view, as well as a first reference object 40a and a second reference object 40b. The reference objects 40a and 40b each have a first reference main surface facing the first distance measuring means 26 or the first light-slit measuring means 26, respectively. A second main surface of reference objects 40a and 40b is facing the second distance measuring means 28 or the second light-slit measuring means 28, respectively. The reference objects 40a and 40b are also distinguished by the fact that the same have a precise predetermined thickness between the reference main surfaces. Reference objects 40a and 40b are produced of materials subject to low thermal expansion.

As can be seen in FIG. 2, the geometrical arrangement of the light-slit measuring means 26 and 28 or the reference objects 40a and 40b, respectively, is selected such that parts 42a and 42b of the measuring light strip generated by the first light-slit measuring means 26 are generated on reference objects 40a and 40b. The same applies for light-slit measuring means 28, wherein due to the partly perspective view in FIG. 2, the light measuring strips generated on the second main surfaces of reference objects 40a and 40b are not visible in FIG. 2.

In the embodiment shown in FIG. 2, the reference means for determining a reference distance between the first light-slit measuring means 26 and the second light-slit measuring means 28 also comprises two reference objects 40a and 40b.

Since the thickness of the reference objects 40a and 40b is exactly known, and the distances to the reference objects 40a and 40b are each also determined during operation of the inventive measuring means of FIG. 2, for example, the distance between the first light-slit measuring means 26 and the second light-slit measuring means 28 can be determined as a reference distance by connecting the distances of the light-slit measuring means 26 to the first main surface of the reference objects 40a and 40b, the thickness of the reference objects 40a and 40b as well as the distances of the second light-slit measuring means 28 to the second main surface of the reference objects 40a and 40b. Alternatively, the difference of the actual thickness of the reference objects to the thickness determined by the light-slit measuring means can be used as reference amount. By means of the difference, the thickness values determined by the light-slit measuring means could be corrected across the whole width of the measuring light strips.

Although the usage of two reference objects 40a and 40b in the embodiment shown in FIG. 2 additionally increases the obtainable measurement accuracy compared to using a single reference object additionally, in a further embodiment of the present invention, merely one reference object can be used for inventively determining a reference distance.

In other words, FIG. 2 shows a further possibility for obtaining a reference measurement, which results when the web width or the width of the object to be measured 20, respectively, is lower than the detection range of used light-slit apparatuses. In this case, reference objects 40a and 40b can be arranged on the right and left side of the web material 20, for example, in the form of sheet metal strips of known thickness at a known angle (horizontally, as shown in FIG. 2). By comparing the thickness of these sheet metal strips determined by the measurement with the light-slit measurement heads, correction values can be determined, which are used for correcting the measurement data for the web material. Also, possible tilting of the light-slit measuring means 26 or 28, respectively, perpendicular to an advance direction 44 can be determined and corrected by measuring the reference objects.

In one embodiment of the present invention, a light strip of monochromatic light, for example, light generated by a laser, is used as a measuring light strip. For avoiding the formation of speckle patterns on the surfaces of the statistical reference objects 40a and 40b, the reference objects (sheet metals) can be moved or vibrated, respectively, so fast in vertical (or horizontal) direction that speckles are averaged out during one light-slit measurement, typically lasting several hundred microseconds. Since for evaluating or considering, respectively, the thickness and for calculating the reference distance merely the difference of the distance from the upper and lower sides of the web material to the respective light-slit measuring means or the respective measurement head, respectively, is used, the vertical position of the comparative sheet metals is insignificant. If the sheet metal has the same thickness at every position, the same applies for the horizontal position, which allows the suppression of speckle patterns in a simple manner according to the invention. This has the great advantage that, according to the invention, laser light can be used, which allows, due to its low divergence, the formation of "thinner" measuring light strips. This additionally increases the obtainable spatial resolution of the inventive method.

As an alternative to the usage of laser light, a white light source can be used for projecting a light line, wherein the reference objects can then be arranged in a static manner.

If light-slit measuring means are used, the advance velocity of the object 20 in the advance direction 44 can be selected extremely high, since light-slit measuring means allow for high measurement frequencies. Thereby, the throughput is greatly increased compared to X-ray methods. Additionally, a high advance velocity in the advanced direction 44 avoids the formation of speckle patterns on the surface of the object, since the same are then averaged out during the measurement period of a measurement phase of the light-slit measuring means. The high possible measurement frequency of light-slit measurement methods allows to project light measuring strips by laser, and to utilize a resulting increase of the spatial resolution.

Additionally, by averaging the measurement signal across several traces of the sensor and by temporally filtering the measurement data, a further improvement of the accuracy of the thickness determination can be obtained when light-slit measuring apparatuses are used. This is possible, since light-slit sensors allow a resolution of 1 mm perpendicular to the advance direction even with 1.5 m width of the light-slit measurement strip, and the measurement frequency of light-slit sensors is significantly higher than the typically necessitated time resolution.

Figure 3A:
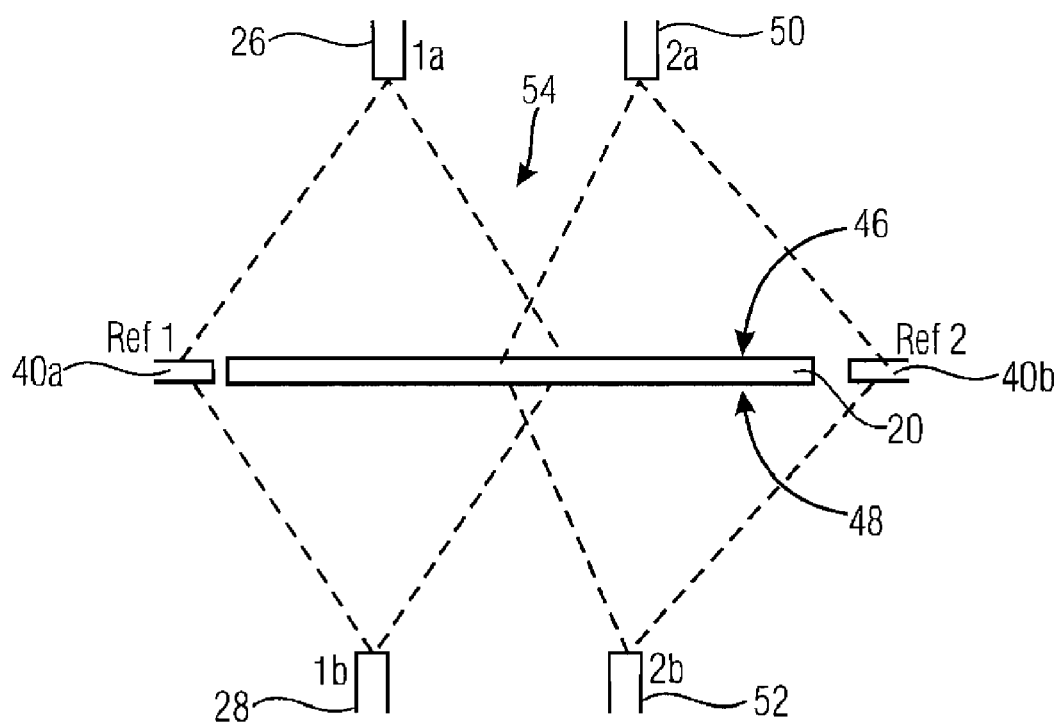
FIG. 3A are a further embodiment of the present invention and 3B with several light-slit measuring means.
Figure 3B:
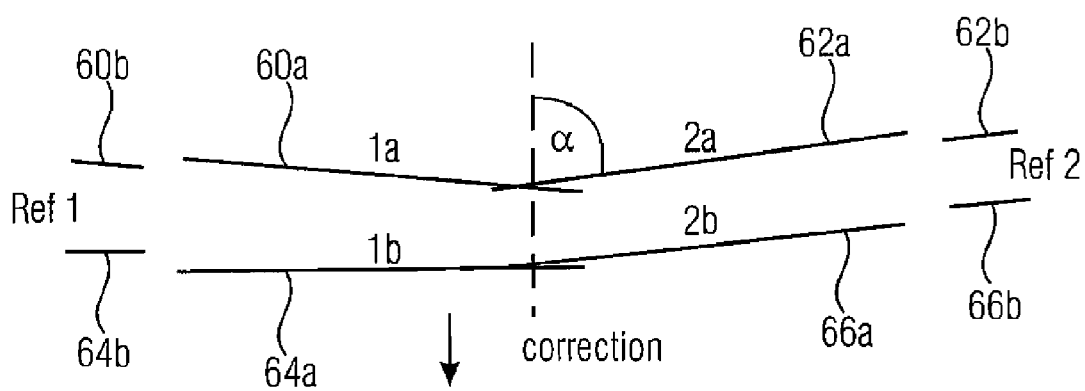
Figure 3B:
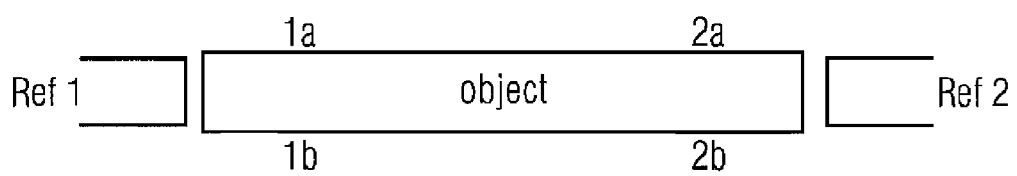

FIGS. 3A and 3B show a further embodiment of the present invention where the object 20 is spatially extended such that two light-slit measuring means are necessitated per side of the object for determining distance information across the whole width of the object. Thus, in addition to the light-slit measuring means 26 facing a first main surface 46 of the object 20 and the second light-slit measuring means 28 associated with a second main surface 24 of the object 20, a third light-slit measuring means 50 (2a) and a fourth light-slit measuring means 52 (2b) are provided. Here, the third light-slit measuring means is facing the first main surface 46, and the fourth light-slit measuring means 52 is facing the second main surface 48. The light planes of the first light-slit measuring means 26 and the third light-slit measuring means 50 are determined by the geometry of the arrangement such that the same intersect in a central overlapping area 54. Additionally, the first light-slit measuring means 26 generates a measuring light-strip on the surface of the first reference object 40a, and the third light-slit measuring means 50 generates a measuring light strip on the surface of the second reference object 40b. The same applies in a mirror-inverted manner for the second light-slit measuring means 28 and the fourth light-slit measuring means 52. The light planes of the second light-slit measuring means 28 and the fourth light-slit measuring means 52 also overlap within the central area 54, the second light-slit measuring means 28 generates a measuring light strip on the first reference object 40a, and the fourth light-slit measuring means 52 generates a measuring light strip on the second reference object 40b.

For example, different light wavelengths with corresponding wavelength filters can be used for distinguishing between the different measuring light strips in the overlapping area, which is monitored simultaneously by two light-slit measuring means. Basically, other methods are possible, for example, fine structuring of the different measuring light strips, for example, by interrupting the measuring light strip in certain intervals so that identification can be obtained through this pattern.

As will be described again below, by using the inventive concept it is also possible to determine the thickness of objects, which have a geometrical extension that exceeds the width maximally accessible with a single light-slit measuring means. Based on FIG. 3B, it is illustrated exemplarily how the thickness of the object 20 can be determined across the whole width of the same from the data of the four light-slit measuring means shown in FIG. 3A. Here, in FIG. 3B, first, for the simplified case of a perfectly planar surface, the pick-ups of the light measuring strips obtained by the sensors of the light-slit measuring means 26, 28, 50 and 52 are illustrated schematically. Here, the first light-slit pick-up segments 60a and 60b are associated with the first light-slit measuring means 26, light-slit pick-up segments 62a and 62b with the third light-slit measuring means 50, light-slit pick-up segments 64a and 64b with the second light-slit measuring means 28 and light-slit recording segments 66a and 66b with the fourth light-slit measuring means 52. Thus, the light-slit pick-up segments 60a, 62a, 64a and 66a are those parts of the measuring light strips that are generated on the surface of the object 20. The light-slit pick-up segments 60b, 62b, 64b and 66b symbolize those parts of the measuring light strips that are generated on the reference objects 40a and 40b.

In the case shown in FIG. 3B, the deviations that can result from the possible inclination or non-parallelism of the individual light-slit measuring means are illustrated in an exaggerated manner for making the inventive method or inventive concept, respectively, clearer.

In order to be able to determine the thickness across the whole width of the object 20 from the measuring light pick-ups of the individual measuring light strips shown schematically in FIG. 3B, first, possible tiltings of the individual measuring light means 26, 28, 50 or 52 are corrected, which is possible with the reference objects analogously to the case discussed in FIG. 2. Then, the results of the first light-slit measuring means 26 are synchronized with the results of the third light-slit measuring means 50, i.e. an angle a between the measuring light pick-up segment 60a and the measuring light pick-up segment 62a is varied for so long until both measuring light pick-ups 60a and 62a provide substantially identical values in the overlapping area 54. This means a possible non-parallelism of the light plane associated with the first light-slit measuring means and the light plane associated with the third light-slit measuring means is corrected. This can be performed, for example, by a least square-fit, which minimizes the square errors of the individual measurements with regard to the value of the light-slit pick-ups obtained by adaptation in the overlapping area 54. The same method is performed for the second light-slit measuring means 28 and the fourth light-slit measuring means 52, so that after adaptation of the different measurement heads, an image shown in FIG. 3B results. By determining the reference distance between the individual light-slit measuring means by using the distances measured to the reference objects 40a and 40b, the thickness of the object to be measured 20 can be determined across its overall width.

While the inventive concept is illustrated in FIGS. 3A and 3B by using merely two light-slit measuring means per side of the object to be measured, inventive measuring means can also have more than two light-slit measuring means per surface. If this is necessitated to cover the whole width of the object 20, similar steps as outlined in FIGS. 3A and 3B can be taken. In this case, in the first step, the angle error of the measurement head perpendicular to the advance direction is determined for both outer measurement arrangements that each detect a reference object located horizontally (or at a known angle). For the measurement arrangements located further to the inside, the tilting is determined successively from the outside to the inside by using the overlapping areas for adapting the measurement curves. The thickness across the whole width of the object 20 then results analogously to the above-described method by using the known thicknesses of reference objects 40a and 40b.

In summary, it can be said that even when the web width is greater than the width that can be covered by a single distance measuring means or an arrangement of one light-slit detector each respectively arranged above and below the web material or the object 20, several such arrangements can be arranged beside one another for covering a greater width. In this case, only the outer measuring means or distance measuring means, respectively, detect one reference part or reference object, respectively, each. If the measurement areas of the arrangements sufficiently overlap, relative movements and possible tiltings of the measurement heads perpendicular to the advance direction can be corrected. Since a light-slit measurement head only detects distances, tilting of a measurement head without correction would lead to incorrect thickness values. As already described above, a schematic illustration of the problem is shown, for example, in FIG. 3B. The left measurement arrangement (light-slit measuring means 26 and 28) detects the left reference part (reference object 40a), the right measurement arrangement (light-slit measuring means 50 and 52) detects the right reference part or the right reference object 40b, respectively. Possible tilting of the individual measurement heads perpendicular to the advance direction, which runs perpendicular to the illustration plane in the case shown in FIG. 3A, is determined and corrected with the help of the horizontally mounted reference objects. After correction of the angle errors, the results of the measurement heads 1a and 2a or 1b and 2b, respectively, are adapted to each other, so that both measurement heads provide mostly identical values in the overlapping area (e.g. by least-square-fit). Thereby, continuous measurement results result for the upper or lower measurement arrangement, respectively.

In a last step, the results are adapted by comparison to the known thicknesses of the reference objects. After this step, thickness values for the web material exist for every measurement point. For a simplified illustration, it is assumed in the case shown in FIGS. 3A and 3B that the object 20 or a web material to be tested, respectively, has a planar surface. Without limitation of the application of the inventive concept, according to the invention, non-planar objects can be measured as well, such as sheet metals that are curved in advance direction, or profile sheet metals that can have a triangular or square or rectangular profile, respectively.

Figure 4:
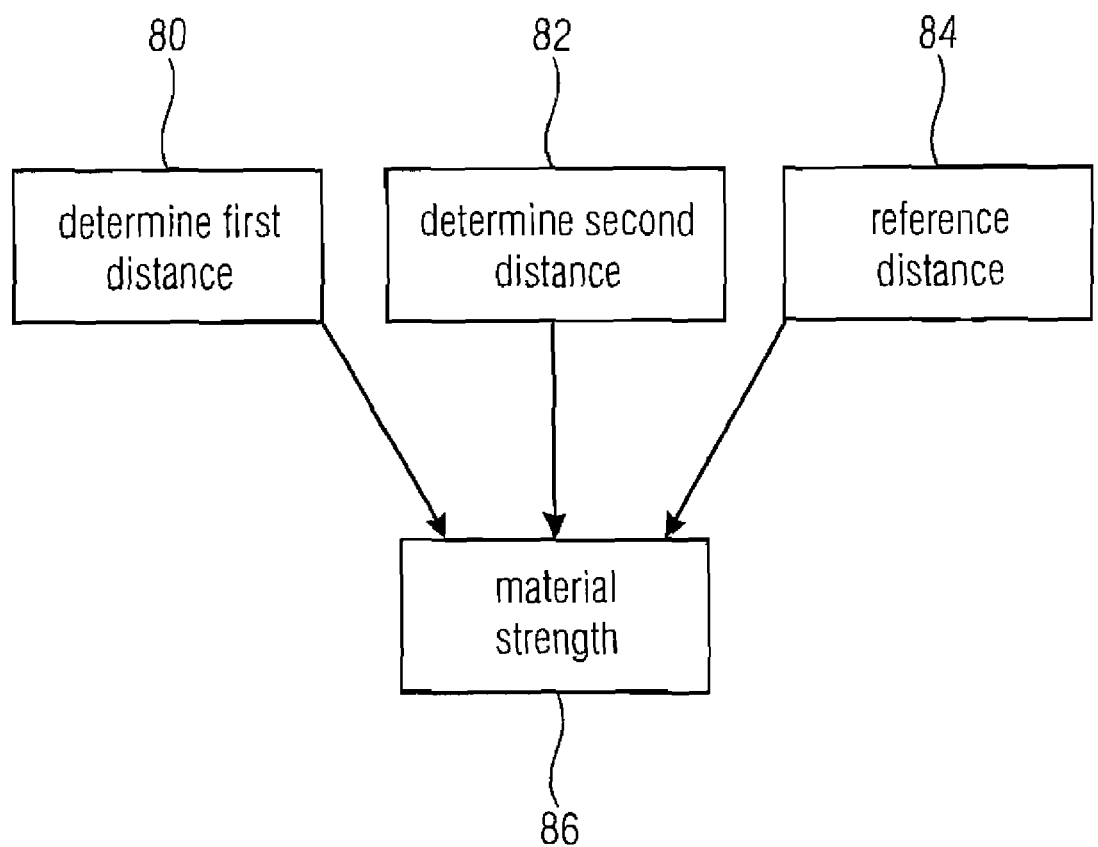
FIG. 4 is an embodiment of an inventive method for determining the material strength of an object.

Based on FIG. 4, an embodiment of the inventive method for determining the material strength of an object is illustrated schematically in the form of a block diagram. For determining the material strength, a first distance between a distance measuring means and a first main surface of the object is determined first in a first distance measurement step 80.

In a second distance measurement step 84, a second distance between a second distance measuring means and a second main surface of the object opposing the first main surface is determined.

In a third step 84, information about a reference distance allowing a determination of a deviation of an actual distance between the first distance measuring means 26 and the second distance measuring means 28 from a set value is provided.

In an evaluation step 86, the material strength of the object is determined from the first distance, the second distance and the reference distance.

Light-slit sensors are used as distance measuring means in the embodiments of the present invention described above. Run time methods, such as ultrasound echo methods or radar echo methods can be taken into consideration that can use, for example, interferences of the reflected and emitted signals for obtaining precise distance information. Although reference objects with cuboid-shaped geometry are shown in FIGS. 2 and 3A or 3B, respectively, according to the invention, reference objects of any other geometries can be used. In a further embodiment of the invention, a reference object in the form of a rotating circular disc is used. Thus, on the one hand, it is obtained that no speckle patterns that decrease the measurement accuracy are formed when using lasers. On the other hand, possible non-planarities in the surface of the circular object that can be caused during production are averaged out by the rotation, so that, overall, the measurement accuracy can be further increased.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A measuring apparatus for determining the material strength of an object, comprising:
    a reference object of a predetermined thickness between a first reference main surface and a second reference main surface, wherein the first reference main surface is facing a first distance measurer and the second reference main surface is facing a second distance measurer;
    wherein the first distance measurer is implemented as light-slit measurer for simultaneously determining a first distance between the first distance measurer and a first main surface of the object facing the first distance measurer as well as a distance between the first reference main surface and the first distance measurer in measurement direction; and wherein
    the second distance measurer is implemented as light-slit measurer for simultaneously determining a second distance between the second distance measurer and a second main surface of the object opposing the first main surface as well as a distance between the second distance measurer and the second reference main surface in measurement direction; and
    an evaluator for determining the material strength of the object between the first main surface and the second main surface by using the first distance, the second distance, the predetermined thickness, the distance between the first reference main surface and the first distance measurer, and the distance between the second reference main surface and the second distance measurer.

2. The measuring apparatus according to claim 1, wherein the first distance measurer and the second distance measurer are implemented to determine the first distance and the second distance in a contactless manner.

3. The measuring apparatus according to claim 1, wherein the measurement direction is perpendicular to the first main surface of the object.

4. The measuring apparatus according to claim 1, wherein the reference object vibrates with a vibration frequency, wherein the vibration frequency is more than ten times a measurement frequency of the first distance measurer or the second distance measurer.

5. The measuring apparatus according to claim 1, further comprising a second reference object of a predetermined thickness between a third reference main surface and a fourth reference main surface, wherein the third reference main surface is facing the first distance measurer and the fourth reference main surface is facing the second distance measurer.

6. The measuring apparatus according to claim 5, wherein the first reference object and the second reference object are arranged on opposing sides of the object in a direction perpendicular to the measurement direction.

7. The measuring apparatus according to claim 1, wherein the first distance measurer comprises a first light-slit measurer comprising a first generator for generating a first measuring light strip on the first main surface of the object; and the second distance measurer comprises a second light-slit measurer comprising a second generator for generating a second measuring light strip on the second main surface of the object.

8. The measuring apparatus according to claim 7, wherein the first generator for generating a first measuring light strip and the second generator for generating a second measuring light strip each comprise one laser.

9. The measuring apparatus according to claim 8, wherein the first generator for generating a first measuring light strip and the second generator for generating a second measuring light strip each comprise one white light source.

10. The apparatus according to claim 7, wherein the first generator for generating a first measuring light strip and the second generator for generating a second measuring light strip are arranged such that the first measuring light strip and the second measuring light strip oppose on opposing main surfaces of the object.

11. The measuring apparatus according to claim 7, wherein the first distance measurer comprises a third light-slit measurer comprising a third generator for generating a third measuring light strip on the first main surface of the object; and
    the second distance measurer comprises a fourth light-slit measurer comprising a fourth generator for generating a fourth measuring light strip on the second main surface of the object, wherein measuring light strips generated by the first generator for generating a measuring light strip and by the third generator for generating a third measuring light strip on the surface of the object spatially overlap in an overlapping area on the surface of the object; and wherein measuring light strips generated by the second generator for generating the second measuring light strip and by the fourth generator for generating the fourth measuring light strip on the second main surface of the object spatially overlap in an overlapping area on the second main surface of the object.

12. The measuring apparatus according to claim 11, wherein the evaluator is implemented to adapt distance information of the first and third light-slit measurer in the overlapping area to each other for acquiring adapted distance information, so that the first and third light-slit measurer show a deviation from the adapted distance information in the overlapping area that lies within a predetermined tolerance range.

13. A method for determining the material strength of an object, comprising:
    determining a first distance between a first distance measurer implemented as light-slit measurer and a first main surface of the object facing the first distance measurer in a measurement direction substantially perpendicular to the first main surface of the object and
    simultaneously determining a distance between a first reference main surface of a reference object of a predetermined thickness and the first distance measurer in the measurement direction;

determining a second distance between a second distance measurer implemented as light-slit measurer and a second main surface of the object opposing the first main surface in measurement direction and simultaneously
determining a distance between a second reference main surface of the reference object opposing the first main surface and the second distance measurer in the measurement direction; and
determining the material strength of the object between the first main surface and the second main surface by using the first and second distances as well as the predetermined thickness, the distance between the first reference main surface and the first distance measurer and the distance between the second reference main surface and the second distance measurer; wherein
the step of determining the first distance is performed by the first distance measurer; and
the step of determining the second distance is performed by the second distance measurer.

14. The method according to claim 13, wherein the first distance, the second distance are determined in a contactless manner.

* * * * *